(12) United States Patent
Janoff et al.

(10) Patent No.: US 6,520,261 B1
(45) Date of Patent: Feb. 18, 2003

(54) THERMAL INSULATION MATERIAL FOR SUBSEA EQUIPMENT

(75) Inventors: Dwight D. Janoff, Missouri City, TX (US); John C. Vicic, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 11 days.

(21) Appl. No.: 09/677,280

(22) Filed: Oct. 2, 2000

Related U.S. Application Data

(60) Provisional application No. 60/197,319, filed on Apr. 14, 2000.

(51) Int. Cl.$^7$ .............................................. E21B 33/14
(52) U.S. Cl. ...................... 166/350; 166/368; 138/141; 428/323; 428/327
(58) Field of Search ................... 138/34, 141; 166/350, 166/368; 428/323, 325, 327, 332, 402.21, 402.24

(56) References Cited

U.S. PATENT DOCUMENTS

| | | | | |
|---|---|---|---|---|
| 3,722,591 A | | 3/1973 | Maxson | |
| 3,742,985 A | * | 7/1973 | Rubenstein | 138/141 |
| 4,061,579 A | * | 12/1977 | Sawko et al. | 252/8.1 |
| 4,595,714 A | | 6/1986 | McAllister et al. | |
| 5,582,249 A | | 12/1996 | Caveny et al. | |
| 5,712,038 A | * | 1/1998 | Yamazaki et al. | 428/411.1 |
| 6,284,809 B1 | * | 9/2001 | Plummer et al. | 521/54 |
| 6,365,268 B1 | * | 4/2002 | Williams et al. | 428/327 |

FOREIGN PATENT DOCUMENTS

WO   WO94/29634 A1   12/1994

\* cited by examiner

*Primary Examiner*—William Neuder
(74) *Attorney, Agent, or Firm*—Henry C. Query, Jr.

(57) ABSTRACT

The invention is an insulation material comprising a novolac cured polysulfide polymer resin. The material is used as a thermal insulator for subsea gas and oil production equipment, such as pipes and wellhead equipment. In order to decrease the maximum exothermic temperature generated by the resin during curing, hollow glass beads are added to the resin. The amine content of the hardener in a standard resin was adjusted to further decrease the maximum exothermic temperature. A fumed silica thixotropic material was also added to increase the viscosity of the mixture. These modifications allow the material to be cast in thick sections without cracking, leaking, or excessive expansion during curing.

23 Claims, 1 Drawing Sheet

FIG. 1
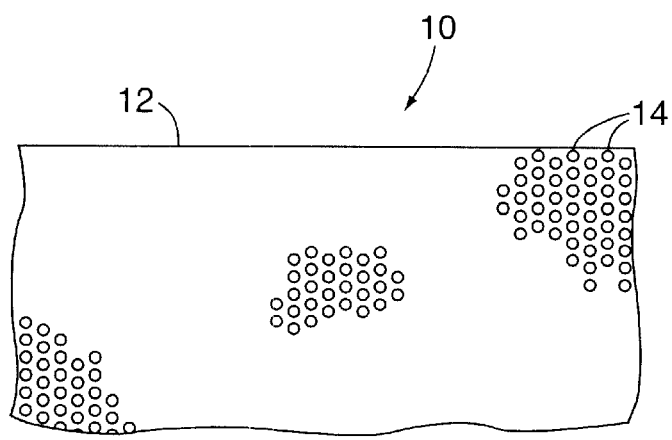
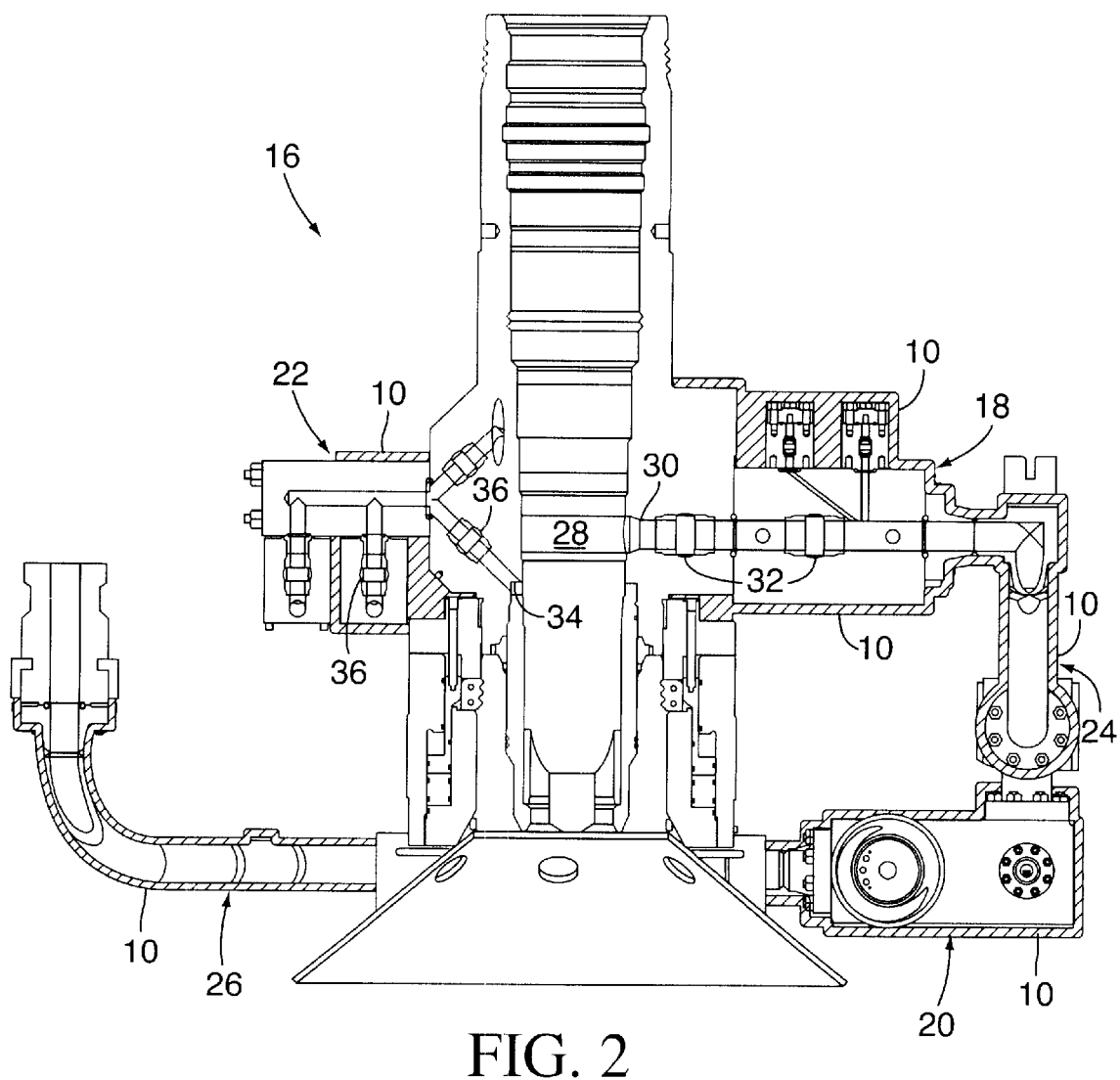
FIG. 2

THERMAL INSULATION MATERIAL FOR SUBSEA EQUIPMENT

This application is based on U.S. Provisional Patent Application No. 60/197,319, which was filed on Apr. 14, 2000.

BACKGROUND OF THE INVENTION

The present invention is related to an insulation material for use on subsea oil and gas production equipment.

When subsea oil and gas wells are located at depths of 5,000 feet or more, the pipelines and wellhead equipment are exposed to seawater which is just a few degrees above freezing. This same temperature can exist in shallow water at extreme latitudes, such as in the North Sea. During a temporary well shutdown, hot produced fluids within the production equipment become stagnant and are cooled by the surrounding seawater. If the stagnant fluids approach the seawater temperature, hydrates can form in the equipment and block the flow of the fluid.

Thermal insulation is sometimes used around subsea pipelines and wellhead equipment to slow the cooling process and delay hydrate formation until flow can be restored. To perform successfully in this environment, a thermal insulation material must have a low thermal conductivity, maintain acceptable insulating and mechanical properties under hydrostatic compression and long term exposure to seawater, have a low rate of water absorption under high pressure, be economical to install, repair and remove on complex or irregular shapes, cure without cracking or leaking from a mold, be flexible and impact resistant, and have good adhesion to the insulated surfaces.

One method of insulating undersea systems involves the use of pre-cast sections of rigid epoxy-syntactic foam. This material comprises a rigid epoxy resin mixed with a high volumetric proportion of hollow glass or ceramic spheres. Although this material exhibits excellent thermal conductivity, it is very brittle. The installation process, which is laborious and expensive, involves casting the material into sheets which are then cut and shaped piecemeal to match the surface of the subsea equipment. Due to the rigidity and brittleness of this material, it is easily damaged when subjected to sudden impacts or high stress levels. To compound this problem, rigid epoxy-syntactic foams are difficult to repair. Removal or replacement of this material is extremely difficult because the sections are bonded to the surface using adhesives or mechanical fasteners.

An alternative to pre-cast epoxy-syntactic foams is a cast-in-place, rigid epoxy-syntactic, such as Textron TyMar 10K™. Unfortunately, these materials are inherently brittle and exhibit a high exothermic temperature on curing, which causes excessive thermal expansion. This combination of thermal expansion and brittleness results in extensive cracking when the material is cast in large sections. This material also exhibits a high rate of water absorption. Furthermore, when cracking does occur during handling or service, a protective resin coated fiberglass wrap is required to keep the material in place.

Alternate materials include urethane syntactics. However, these materials exhibit a higher rate of water absorption, and are relatively expensive. Also, the typically short curing times of urethane syntactics make them difficult to cast in large or complex sections.

SUMMARY OF THE INVENTION

The present invention is a thermal insulation material which comprises a matrix made from a novolac cured polysulfide polymer resin. The preferred resin is a modified version of Thiokol® FNEC 2515, in which the amount of the tertiary amine in the resin hardener has been reduced to slow the curing reaction and thereby decrease the maximum exothermic temperature generated during curing. The thermal insulation material also comprises a plurality of preferably hollow glass beads contained within the matrix to decrease the exothermic heat generated during curing and also improve the thermal conductivity of the material. In addition, a fumed silica thixotropic material may be added to the thermal insulation material to increase its viscosity.

The thermal insulation material of the present invention exhibits many advantageous properties which make the material particularly beneficial for use on subsea oil and gas production equipment. The matrix material is highly flexible, which makes the insulation material resistant to cracking under thermal or mechanical stress. In addition, the reduced exothermic heat decreases the thermal expansion rate exhibited by the insulation material during curing. Also, because of its flexibility and minimal thermal expansion, the insulation material of the present invention can be cast-in-place in thick sections without cracking. Furthermore, the increased viscosity of the insulation material prevents the mixture from leaking through seams in the mold during application, further improving the cast-in-place performance of the material. The insulation material also exhibits a low rate of water absorption, and excellent adhesion to both bare metals and epoxy coatings. Thus, the material as cast exhibits mechanical and thermal properties which are well within acceptable limits for subsea equipment applications. Furthermore, these properties remain within acceptable limits even after prolonged exposure to water at high temperatures and pressures.

These and other objects and advantages of the present invention will be made apparent from the following detailed description, with reference to the accompanying drawings.

BRIEF DESCRIPTION OF THE DRAWINGS

FIG. 1 is a cross sectional view of the thermal insulation material of the present invention; and FIG. 2 is a cross sectional view of a subsea christmas tree having the thermal insulation of the present invention applied thereto.

DETAILED DESCRIPTION OF THE PREFERRED EMBODIMENTS

The present invention is an insulation material suitable for subsea oil and gas production equipment. Referring to FIG. 1, the insulation material, which is indicated generally by reference number 10, comprises a matrix 12 of a suitable polymer based resin material and a plurality of micro beads 14. In addition, the preferred insulation material 10 also comprises a viscosity modifier to increase the viscosity of the mixture prior to curing.

The matrix 12 preferably comprises a polysulfide based resin material. A preferred matrix 12 comprises a novolac cured polysulfide polymer resin. The preferred matrix 12 is based on a flexible epoxy novolac coating modified with polysulfide, which is available from Polyspec Corporation of Houston, Tex. under the brand name Thiokol® FNEC 2515. This material is modified by reducing the amount of the tertiary amine in the resin hardener to slow the curing reaction and thereby decrease the maximum exothermic temperature generated during curing of the insulation material 10. The amount by which the tertiary amine is reduced is determined empirically to maintain a suitably low exothermic temperature within an acceptable cure time. In a preferred embodiment of the invention, the tertiary amine is reduced by an amount sufficient to maintain the exothermic temperature under about 200° F. A suitable matrix 12 can be obtained by mixing the resin known as "99-NovoTherm® A" with a the resin hardener known as "99-NovoTherm® B", both of which are available from Polyspec Corporation. Alternatively, the matrix material 12 could comprise any other suitable resin, such as a manganese oxide cured polysulfide elastomer.

The addition of the micro beads 14 also contributes to a reduction in the maximum exothermic temperature generated during curing of the insulation material 10. The micro beads 14 are preferably hollow, preferably glass beads having a mean diameter of up to about 85 microns. In order to withstand the hydrostatic pressure of a deep sea environment, the beads preferably have an isostatic strength of at least approximately 4,000 psi. Suitable micro beads for use in this application are Scotchlite™ S38 Glass Bubbles available from 3M Corporation. While glass micro beads 14 are preferred, the micro beads could be made of any suitable material, such as ceramic or a polymer.

The insulation material 10 should include as large a quantity of the micro beads 14 as possible to facilitate effective thermal insulation while maintaining the degrees of water absorption and brittleness of the insulation material below maximum acceptable levels. Thus, prior to adding the viscosity modifier, the insulation material 10 should include about 50–95% by volume of the matrix 12 and about 5–50% by volume of the micro beads 14. Preferably, the insulation material 10 should include about 75–90% by volume of the matrix 12 and about 10–25% by volume of the micro beads 14. More preferably, the insulation material comprises about 82–87% by volume of the matrix 12 and about 13–18% by volume of the micro beads 14. In one embodiment of the invention, an acceptable insulation material 10 was achieved by mixing 85% by volume of the matrix 12 with 15% by volume of the micro beads 14, as measured prior to adding the viscosity modifier. It should be noted that micro beads 14 of two or more mean diameters may be combined in order to achieve a larger concentration of the micro beads in the insulation material 10.

The viscosity modifier could be any suitable substance which is effective in increasing the viscosity of the insulation material 10. The preferred viscosity modifier is CAB-O-SIL® TS-720 Treated Fumed Silica, available from Cabot Corporation of Boston, Mass. In the embodiment of the invention wherein the insulation material 10 is cast, the insulation material should comprise between about 5 and 30 grams of viscosity modifier per liter of matrix 12. Preferably, the insulation material comprises between about 5 and 20 grams of viscosity modifier per liter of matrix 12. More preferably, the insulation material comprises between about 8 and 10 grams of viscosity modifier per liter of matrix 12. In one embodiment of the invention, an acceptable insulation material 10 which was suitable for casting comprised 9.2 grams of viscosity modifier per liter of matrix.

Obviously, a more viscous insulation material 10 may be achieved by adding more viscosity modifier. Thus, in applications where it is desired to trowel the insulation material onto the equipment to be insulated, for example, to make repairs to a previously applied insulation material, the insulation material may comprise more viscosity modifier than the limits mentioned above. For example, an insulation material 10 which can be troweled on the equipment to be insulated may comprise between about 30 and 50 grams of viscosity modifier per liter of matrix 12. More viscosity modifier may be employed to achieve an even more viscous insulation material; however, the concentration of viscosity modifier should be below the amount which would make the mixture so dry as to no longer be coherent.

An exemplary mixture of the insulation material 10 is made by mixing the following constituent substances in any order:

20 parts by volume of the modified Polyspec Thiokol® FNEC 2515 resin;

3 parts by volume of the Scotchlite® S38 Glass Bubbles; and 9.2 grams of CAB-O-SIL™ TS-720 Treated Fumed Silica per litter of resin.

When cast to a thickness of approximately 2.5 inches, this mixture reached a maximum exothermic temperature of 189° F., and expanded approximately 5 to 6% relative to the original volume when poured. Both of these measurements are within acceptable limits for the intended application. Listed below are the relevant thermal and mechanical properties of this material, both before after hydrostatic testing. All of these properties are within acceptable limits for the intended application.

| Property | Value |
| --- | --- |
| Hardness | 46 Shore D |
| Tensile Strength | 940 to 1030 psi |
| Tensile Elongation | 35 to 45% |
| Compressive Strength | 30,000 psi |
| Thermal Conductivity (dry) | 0.12 BTU/(hr · ft · ° F.) |
| Density | 67 lbs/ft$^3$ |
| Specific Heat | 0.52 BTU/(lb · ° F.) |
| Thermal Diffusivity (dry) | 0.003 ft$^2$/hr |
| Glass Transition Temperature | 13° C. |

The thermal insulation material of the above example exhibited the following properties after exposure to water at 230° and 300 psi for 15 days.

| Property | Value |
| --- | --- |
| Water absorption | 5% |
| Thermal Conductivity (wet) | 0.13 BTU/(hr · ft · ° F.) |
| Hardness | 33 Shore D |

The insulation material of the present invention can be used to thermally insulate any object from a surrounding fluid. In the preferred embodiment, the material is used to insulate undersea pipes and wellhead equipment from seawater. Referring to FIG. 2, the insulation material 10 is shown applied to certain portions of a subsea Christmas tree 16. The subsea Christmas tree with which the present invention may be used can be of any known type of subsea Christmas tree, including the so-called horizontal and conventional christmas trees. Using FIG. 2 as an example, such trees typically include an axial production bore 28 in communication with the well bore, a production outlet 30 connected to the production bore, one or more production valves 32 for controlling flow through the production outlet 30, a choke 20 connected to the production outlet 30 via a flow loop 24, an annulus outlet 34 connected to the tubing annulus surrounding the production tubing (not shown), one or more annulus valves 36 for controlling flow through the annulus outlet 34, and a production flow loop 26 for connecting the production outlet with an undersea pipe (not shown). Ideally, the insulation material is applied to those portions of the christmas tree 16 which are most exposed to the surrounding seawater and through which the produced fluids will flow. For example, in FIG. 2 the insulation material 10 is shown applied to the production valve block 18 housing one or more of the production valves 32, the choke 20, the annulus valve block 22 housing one or more of the annulus valves 36, and the flow loops 24 and 26. Of course, the insulation material 10 may be applied to additional or fewer components of the subsea christmas tree 16 as desired or required under particular circumstances. The thickness of the insulation material 10 in the direction of heat transfer is preferably between about 0.25" and 2", although the thickness may vary depending on the environment and the geometry of the surface to be insulated.

The insulation material 10 can be installed using a variety of methods. In the preferred method, a form or mold is constructed around the object to be insulated. The material is then cast between the object and the mold and allowed to cure. Once the material has cured, the mold is removed. Alternatively, the insulation material can be pre-cast into sections which are shaped to complement the object to be insulated. Once the pre-cast sections have cured, they may be secured to the object using adhesives, mechanical fasteners, or any other suitable means. The insulation material can also be sprayed on the object using a spray nozzle or similar device.

In accordance with an alternative embodiment of the invention, both the micro beads and the viscosity modifier could be omitted from the insulation material 10. Although the casting performance of this embodiment is inferior to the preferred embodiment, this alternate embodiment exhibits superior flexibility and water absorption characteristics.

In accordance with another embodiment of the invention, the insulation material 10 comprises a base layer and an outer coating overlaying the base layer. The base layer is preferably an inexpensive, flexible thermally insulating material, such as any of the polysulfide based resins mentioned above. Other suitable base layer materials include a metal oxide cured polysulfide resin and a peroxide cured polysulfide resin. The outer coating preferably exhibits low water absorption under high pressure so as to form an effective sealant for the base layer. Suitable outer coating materials include any of the preferred insulation materials 10 discussed above.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. An insulation material comprising:
   a polysulfide based resin matrix;
   a plurality of non-metallic beads within said matrix; and
   a viscosity modifier to increase the viscosity of the insulation material prior to curing.

2. The insulation material of claim 1, wherein said matrix comprises a novolac cured polysulfide polymer resin.

3. The insulation material of claim 1, wherein said matrix comprises a manganese oxide cured polysulfide elastomer resin.

4. The insulation material of claim 1, wherein said beads comprise hollow glass beads.

5. The insulation material of claim 4, wherein said beads comprise a mean diameter of less than about 85 microns and an isostatic strength of at least about 4000 psi.

6. The insulation material of claim 1, wherein said viscosity modifier comprises fumed silica.

7. An insulation material comprising:
   about 50–95% by volume of a matrix comprising a novolac cured polysulfide polymer resin;
   about 5–50% by volume of a plurality of hollow glass beads having a mean diameter of about 85 microns; and
   a viscosity modifier for increasing the viscosity of the insulation material before curing.

8. The insulation material of claim 7, comprising:
   about 75–90% by volume of the matrix; and
   about 10–25% by volume of the glass beads; and
   wherein the viscosity modifier comprises between about 5 and 20 grams of fumed silica per liter of the matrix.

9. The insulation material of claim 8, comprising:
   about 82–87% by volume of the matrix;
   about 13–18% by volume of the glass beads; and
   between about 8 and 10 grams of fumed silica per liter of the matrix.

10. The insulation material of claim 9, comprising:
    about 85% by volume of the matrix;
    about 15% by volume of the glass beads; and
    about 9.2 grams of fumed silica per liter of the matrix.

11. A method of thermally insulating an object from a surrounding fluid, said method comprising interposing the insulation material of claim 1 between said object and said fluid.

12. The method of claim 11, wherein the interposition of said insulation material is achieved by:
    constructing a mold a predetermined distance from said object; and
    casting said insulation material between said object and said mold.

13. The method of claim 11, wherein the interposition of said insulation material is achieved by:
    pre-casting said insulation material into at least one section, said section being shaped to complement the shape of at least a portion of said object; and
    fastening said pre-cast section to said object.

14. The method of claim 11, wherein the interposition of said insulation material is achieved by spraying said material onto said object.

15. A subsea Christmas tree comprising:
    a production bore;
    a production outlet connected to the production bore;
    a flow loop in communication with the production outlet; and
    a polysulfide based thermal insulation material surrounding at least a portion of the flow loop.

16. The subsea christmas tree of claim 15, wherein the thermal insulation material comprises:
    a polysulfide based resin matrix;
    a plurality of non-metallic beads within said matrix; and
    a viscosity modifier to increase the viscosity of the insulation material prior to curing.

17. The subsea christmas tree of claim 16, wherein said matrix comprises a novolac cured polysulfide polymer resin.

18. The subsea christmas tree of claim 16, wherein said beads comprise hollow glass beads.

19. The subsea christmas tree of claim 18, wherein said beads comprise a mean diameter of less than about 85 microns and an isostatic strength of at least about 4000 psi.

20. The subsea christmas tree of claim 16, wherein said viscosity modifier comprises fumed silica.

21. The subsea christmas tree of claim 15, wherein said thermal insulation material comprises:
   a base layer disposed over said portion of said flow loop; and
   an outer coating disposed over said base layer.

22. The subsea christmas tree of claim 21, wherein said base layer comprises a polysulfide based resin.

23. The subsea christmas tree of claim 22, wherein the outer coating comprises:
   a polysulfide based resin matrix;
   a plurality of non-metallic beads within said matrix; and
   a viscosity modifier to increase the viscosity of the insulation material prior to curing.

* * * * *